No. 721,581. PATENTED FEB. 24, 1903.
D. LUBIN.
POWER OPERATED AGRICULTURAL IMPLEMENT.
APPLICATION FILED JULY 15, 1902.
NO MODEL. 5 SHEETS—SHEET 1.

WITNESSES:
INVENTOR
David Lubin
BY
ATTORNEYS.

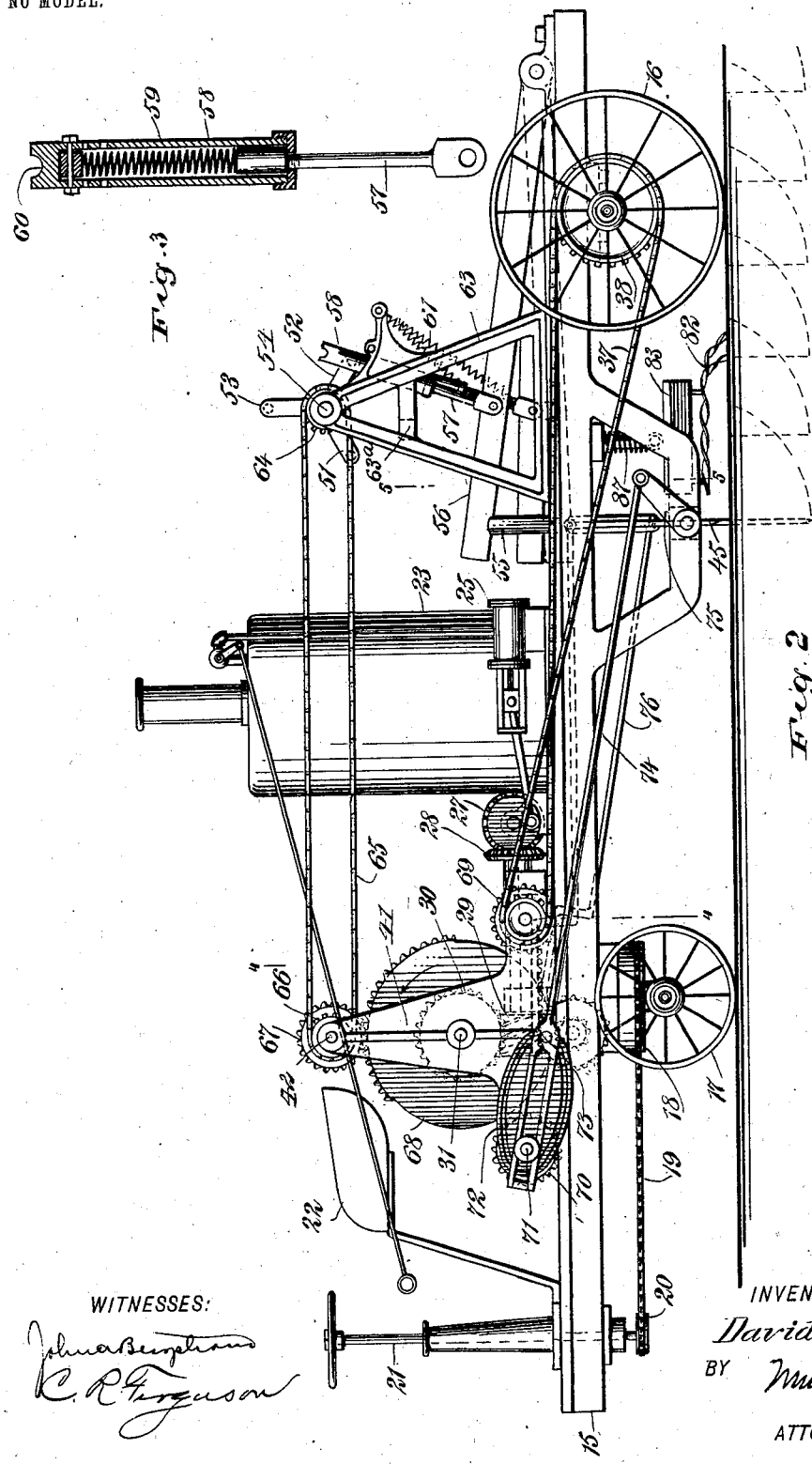

No. 721,581. PATENTED FEB. 24, 1903.
D. LUBIN.
POWER OPERATED AGRICULTURAL IMPLEMENT.
APPLICATION FILED JULY 15, 1902.
NO MODEL. 5 SHEETS—SHEET 3.

WITNESSES: INVENTOR
David Lubin
BY
ATTORNEYS.

No. 721,581. PATENTED FEB. 24, 1903.
D. LUBIN.
POWER OPERATED AGRICULTURAL IMPLEMENT.
APPLICATION FILED JULY 15, 1902.
NO MODEL. 5 SHEETS—SHEET 4.
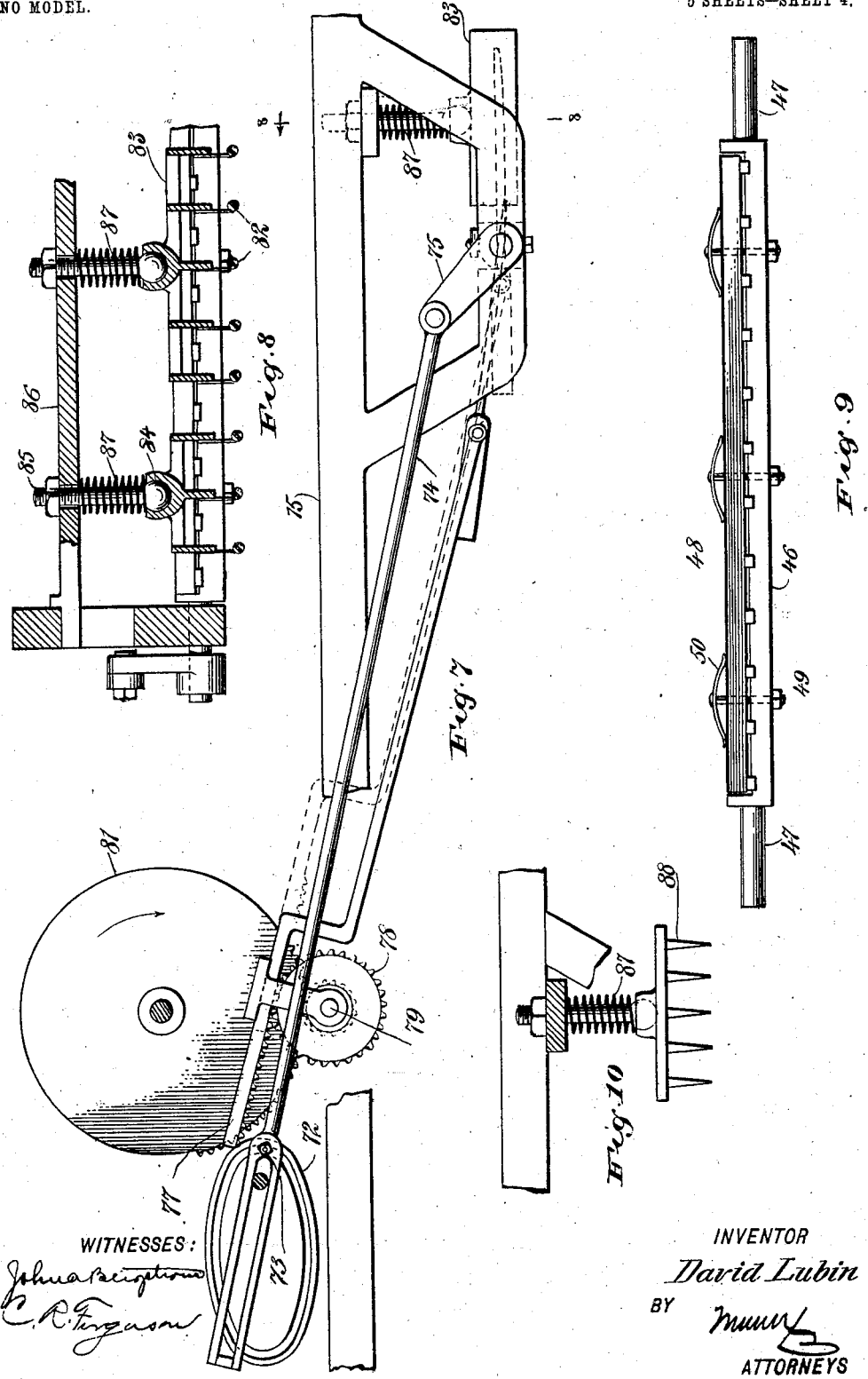
WITNESSES:
INVENTOR
David Lubin
BY
ATTORNEYS No. 721,581. PATENTED FEB. 24, 1903.
D. LUBIN.
POWER OPERATED AGRICULTURAL IMPLEMENT.
APPLICATION FILED JULY 15, 1902.
NO MODEL. 5 SHEETS—SHEET 5.
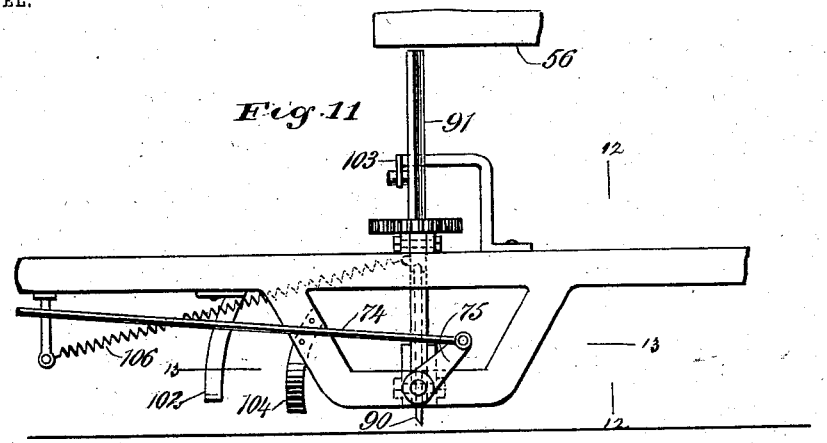
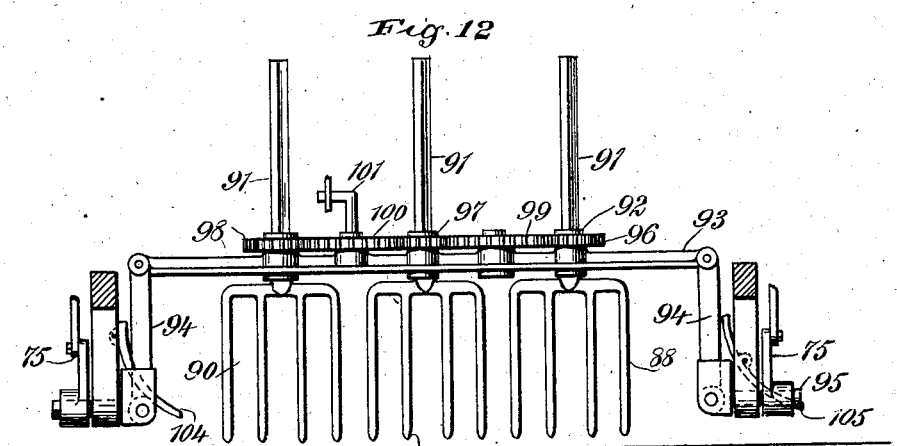
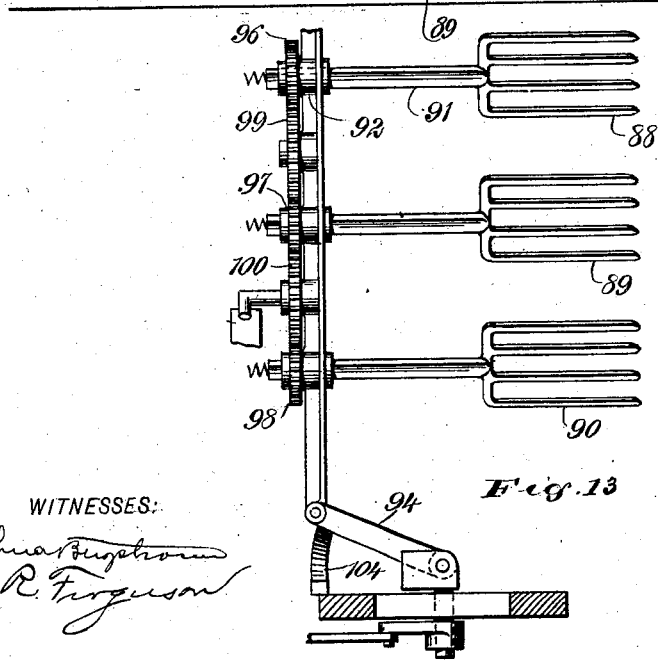
WITNESSES:
INVENTOR
David Lubin
BY
ATTORNEYS.

UNITED STATES PATENT OFFICE.

DAVID LUBIN, OF NEW YORK, N. Y.

POWER-OPERATED AGRICULTURAL IMPLEMENT.

SPECIFICATION forming part of Letters Patent No. 721,581, dated February 24, 1903.

Application filed July 15, 1902. Serial No. 115,665. (No model.)

*To all whom it may concern:*

Be it known that I, DAVID LUBIN, a citizen of the United States, and a resident of the city of New York, borough of Manhattan, in the county and State of New York, have invented a new and Improved Power-Operated Agricultural Implement, of which the following is a full, clear, and exact description.

This invention relates to improvements in agricultural implements designed to be operated by steam or other motive agent in such manner as to alternately move the device and operate the ground-digging tool or tools and by means of which the ground will be uniformly operated upon, finely pulverized, and prepared for planting or seeding.

I will describe a power-operated agricultural implement embodying my invention and then point out the novel features in the appended claims.

Reference is to be had to the accompanying drawings, forming a part of this specification, in which similar characters of reference indicate corresponding parts in all the figures.

Figure 1:
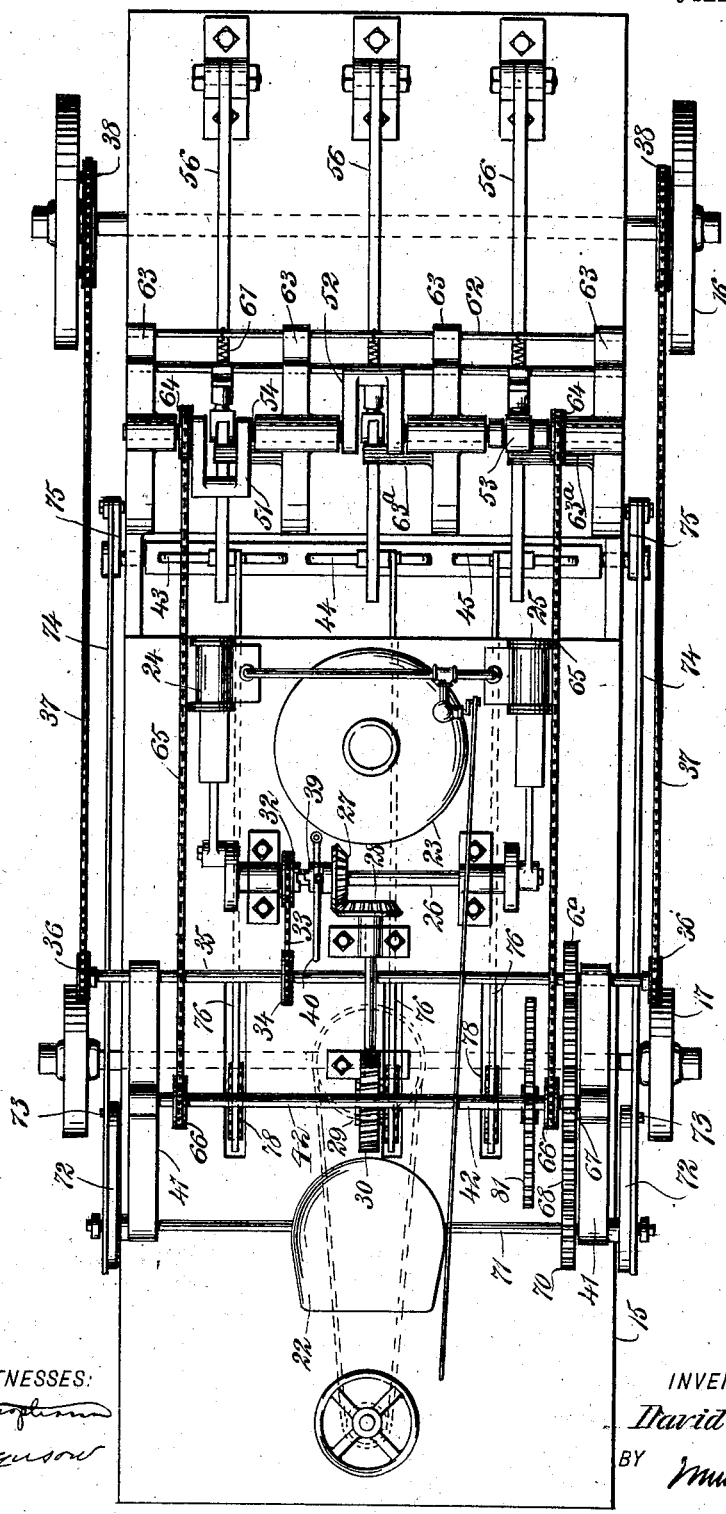
Figure 4:
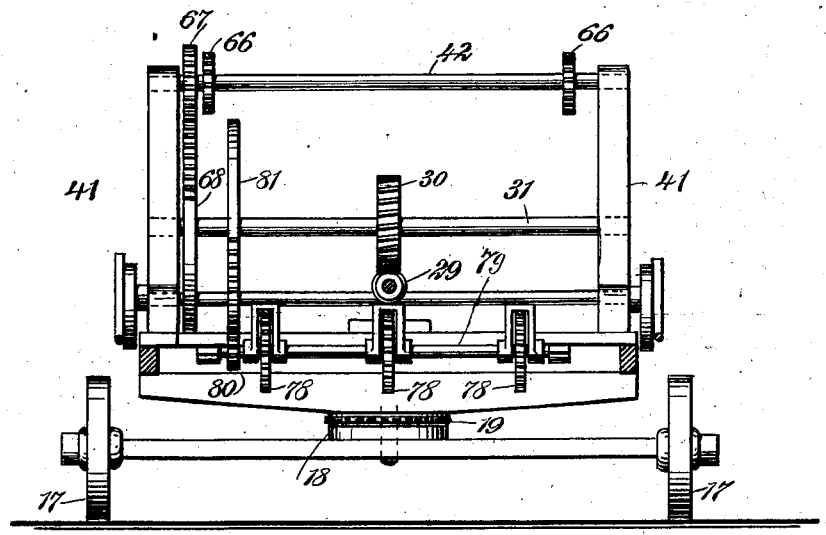
Figure 5:
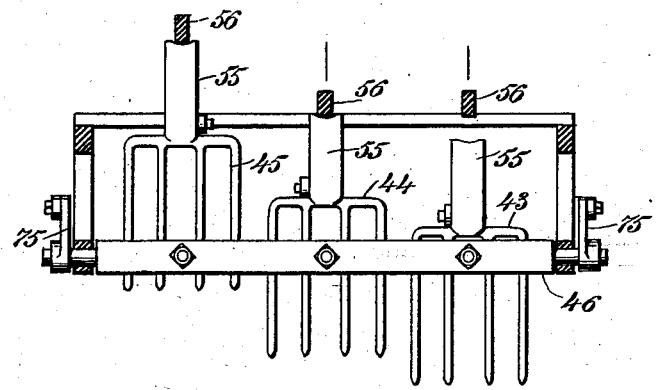
Figure 6:
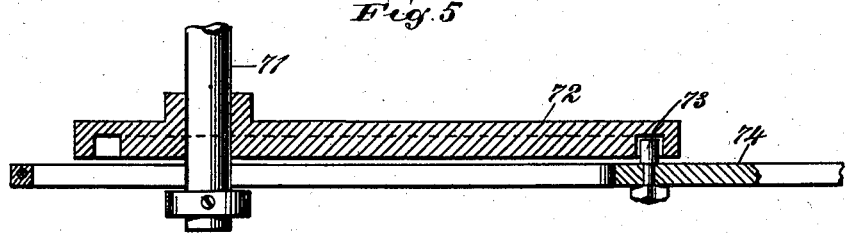

Figure 1 is a plan view of a power-operated agricultural implement embodying my invention. Fig. 2 is a side elevation thereof. Fig. 3 is a sectional detail showing one of the driving-plungers employed. Fig. 4 is a section on the line 4 4 of Fig. 2. Fig. 5 is a section on the line 5 5 of Fig. 2. Fig. 6 is a section of a tool-actuating cam employed. Fig. 7 is a side elevation of the tool-actuating mechanism. Fig. 8 is a section on the line 8 8 of Fig. 7. Fig. 9 is a plan view of the tool-guide. Fig. 10 is a detail illustrating a modified form of breaking-tines that may be employed. Fig. 11 is a side elevation showing a digging-tool of modified arrangement. Fig. 12 is a section on the line 12 12 of Fig. 11, and Fig. 13 is a section on the line 13 13 of Fig. 11.

Referring to the drawings, 15 designates the body or frame of the machine, mounted on the rear wheels 16 and the front wheels 17. The front wheels 17 are designed for starting the machine, and therefore the axle is provided with a sprocket-wheel 18, from which a chain 19 extends to a sprocket-pinion 20 on the steering-shaft 21 forward of the operator's seat 22. Mounted on the frame is an engine, here shown as comprising a boiler 23, from which steam is supplied to cylinders 24 25, the pistons of which have connection with a crank-shaft 26. On this crank-shaft is a bevel-gear 27, meshing with a bevel-gear 28, on the shaft of which is a worm 29, engaging with a worm-wheel 30 on a counter-shaft 31. The bevel-gear 27 is loosely mounted on the shaft 26, and also loosely mounted on said shaft is a sprocket-wheel 32, from which a chain 33 extends to a sprocket-wheel 34 on a shaft 35, secured to the ends of which are sprocket-wheels 36, and from these sprocket-wheels 36 chains 37 extend to sprocket-wheels 38, connected to the rear wheels 16 of the machine. The wheels 27 and 32 are provided with clutch members designed to be engaged by a clutch member 39, which may be moved along the shaft 26 by means of a lever 40. The object of this arrangement will be more clearly described hereinafter.

The shaft 31 has bearings in standards 41, and also having bearings in said standards is a shaft 42, the said shaft 42 being arranged above the shaft 31.

In this machine I design to employ one or more sets of digging-tools. I have here shown three sets of digging-tools in the form of forks or tines 43, 44, and 45. These digging-tools are movable in a rock-shaft comprising a section 46, having shaft portions 47, and a section 48, held in engagement with the section 46 by means of bolts 49, to the forward ends of which springs 50 are attached, the said springs bearing at their ends against the front side of the section 48. By this arrangement the section 48 will yield relatively to the section 46, the tines of the digging-tools being readily movable between the sections.

It is designed that the several sets of digging-tools shall be forced into the ground one after the other, as such operation will require less power from the engine than would be required were all the tools driven into the ground at one time. To accomplish this, cams or crank-arms 51, 52, and 53 are mounted on the crank-shaft 54, the several cams or cranks being arranged at different angles or projections from the shaft.

Arranged above each digging-tool and designed to engage with the upwardly-projecting stem 55 thereof is a lever 56, and attached to each lever is a driving-plunger comprising two telescopic sections 57 58. The section 57 is pivotally connected to the lever and is movable in the tubular section 58, a strong spring 59 being engaged between the inner end of the section 57 and the upper end of the section 58. The upper end of each section 58 is provided with a notch 60, in which the crank-pin is designed to be engaged.

For moving the levers 56 upward, as will be hereinafter described, I employ springs 61, which are connected to said levers and also connected to a bar 62, connected to standards 63, in which the shaft 54 has its bearings. On the shaft 54 are sprocket-pinions 64, from which chains 65 extend to sprocket-pinions 66 on the shaft 42. Also on this shaft 42 is a pinion 67, designed to be engaged by the teeth of a mutilated gear 68, secured to the shaft 31. The mutilated gear 68 is also designed to engage with a pinion 69 on the shaft 34 for the purpose of driving the machine forward, and at a certain time the teeth of said mutilated gear are to engage with a pinion 70 on a shaft 71, on the ends of which are secured cam-wheels 72, in the channels of which wrist-pins 73 are engaged. These wrist-pins are attached to draw-bars 74, extended from crank-arms 75 on the portions 47 of the rock-shaft carrying the digging-tools. These draw bars or rods 74 are slotted, and the shaft 71 passes through these slots.

Attached to each digging-tool is what may be termed a "replacing" or "withdrawing" bar 76, the said drawing-bars being provided with rack portions 77 for engaging with gear-wheels 78, mounted on a shaft 79, and also on this shaft 79 is a pinion 80, which at certain times is engaged by the teeth of the mutilated gear 81, connected to the shaft 31.

Rearward of the digging-tools are spiral breaking-tines 82, the rear ends of which are curved downward, so as to engage with the broken ground and smooth the same. These breaking-tines are mounted on frames 83, which have universal-joint connection 84, with bolts 85 extended upward and loosely through openings in a bar 86. Arranged between the bar 86 and the members of the universal joints connected to the frames 83 are springs 87. By this construction the frames carrying the breaking-tines are permitted to swing laterally and also to move upward should an obstruction, such as a stone, be engaged between the digging-tools and said breaking-tines. Therefore there will be no danger of breaking either the tools or the breaking-tines. Instead of the breaking-tines as indicated at 82 I may employ breaking-tines in the form of drag-teeth 88, which are mounted on frames in a manner similar to the tines 82.

In the operation of the machine as so far described it is to be understood that the machine moves over the ground a short distance, then stops, and at this interval the digging-tools are operated. When the machine comes to a stop, the teeth of the mutilated gear 68 engage with the pinion 67, which by rotating the shafts 42 and 54 will cause the cams or cranks on said shaft 54 to consecutively engage with the driving-plungers, forcing the levers 56 downward, and consequently move or force the digging-tools into the ground one after the other. Then the teeth of said mutilated gear 68 will engage with the pinion 70, which will operate the cams 72, and the operation of these cams will move the digging-tools upward to lift the earth, and the movement of the digging-tools will be sufficient to force the earth between the breaking-tines, thoroughly pulverizing the earth. Immediately after this movement the digging-tools will be thrown forward or to normal position with relation to the rock-shaft by means of the draw-bars 76 and the pinions 78.

Should one of the digging-tools engage with a stone or other obstruction that would prevent its entire entrance into the ground, said digging-tool will be moved, as heretofore described, to lift the earth and will also be withdrawn to normal position by means of its draw-rod and rack mechanism, because as the shaft 79 continues to rotate through the operation of the mutilated gear 81 it will move the draw bars or rods 76 to the limit provided by the rack portions 77. After reaching the limit the gear-wheels 78 may continue to revolve until the last draw-bar is operated or drawn to its limit. As this withdrawing movement of the digging-tools must be very quick, I have provided the pinion 80.

The continued movement of the cams 72 will return the rocking shaft to normal position—that is, to bring the teeth of the digging-tools in vertical alinement, so that their stem portions will again engage with the levers 56. After this operation the teeth of the mutilated gear 68 will engage with the pinion 69 and cause the machine to move forward to a position for the next digging operation.

When it is desired to move the machine from one field to another or from a field to a place of storage, the sprocket-wheel 32 is to be placed in operative engagement with the shaft 26 by shifting the clutch member 39.

In Figs. 11, 12, and 13 I have shown digging-tools designed to be moved into the ground in the manner heretofore described, moved upward to lift the earth, then shifted laterally, and turned axially to dump the load of dirt. These digging-tools are made in the form of forks 88 89 90, which have stem portions 91, mounted to move through sleeves 92, which rotate in a bar 93, having pivotal connection at its ends with arms 94, the lower ends of which are pivoted to shaft members 95, to which the cranks 75 are attached. On the sleeves 92 are pinions 96, 97, and 98, and arranged between the pinions 96 and 97 and meshing therewith is a gear-wheel 99, while a similar gear-wheel 100 engages with the pinions 97 and 98. On the shaft of the pinion 100 is a crank-arm 101, designed to engage at a certain time with an arm 102, depending from the frame of the machine, and at another time with an arm 103, mounted on the machine-frame.

In the operation of this device, however, the digging-tools having been forced into the ground upon the upward movement of the tools to lift the earth one of the arms 94 will engage with the upper surface of a curved deflector-arm 104, which by moving down thereon will move the several digging-tools laterally, forcing the opposite arm 94 underneath a deflecting-arm 105. After this lifting motion the digging-tools will be drawn upward or forward by means of springs 106. Before this withdrawing motion, however, the crank-arm 101 will engage with the arm 102, which will rotate the digging-tools axially and dump the dirt practically in the hole from which it was lifted. As the digging-tools approach a vertical position the said crank-arm 101 will engage with the arm 103, which will move the tools to normal or horizontal position.

Having thus described my invention, I claim as new and desire to secure by Letters Patent—

1. An agricultural implement comprising a carriage, a motor mounted thereon, a digging-tool supported on the carriage, and means operated by the motor for consecutively moving the carriage, forcing the tool into the ground, then lifting the tool with the earth and returning the tool to normal position, substantially as specified.

2. An agricultural implement comprising a carriage, a motor mounted thereon, digging-tools carried by the carriage, means operated by the motor for alternately operating the digging-tool and moving the carriage, and breaking devices rearward of the digging-tool, substantially as specified.

3. An agricultural implement comprising a carriage, a motor mounted thereon, a digging-tool mounted on the carriage, means for alternately moving the carriage forward and operating the digging-tool, and breaking devices having yielding connection with the carriage, substantially as specified.

4. An agricultural implement comprising a carriage, a motor thereon, a series of digging-tools on the carriage, means operated by the motor for moving the carriage forward, and means operated by the motor for forcing the digging-tools into the ground one after another, substantially as specified.

5. An agricultural implement comprising a carriage, a motor mounted thereon, a plurality of digging-tools supported on the carriage, means operated by the motor for moving the carriage forward, and means operated by the motor for forcing the digging-tools into the ground one after another, then moving the digging-tools upward to lift the earth, and then moving the digging-tools to normal position, substantially as specified.

6. An agricultural implement comprising a carriage, a motor thereon, a rock-shaft, a digging-tool comprising tines movable relatively to the rock-shaft and carried thereby, a lever for engaging with an upward projection of the digging-tool, a driving-plunger having connection with the lever, a shaft driven from the motor, and a cam or crank on said shaft for engaging with the driving-plunger, substantially as specified.

7. An agricultural implement comprising a carriage, a motor thereon, a series of digging-tools consisting of forks, a rock-shaft in which said digging-tools are movable, a driving connection between the carriage and motor, levers for engaging with upward projections of the digging-tools, driving-plungers pivoted to said levers, a shaft driven from the motor, and a series of cranks on said shaft arranged at different angles for engaging with the driving-plungers one after another, substantially as specified.

8. An agricultural implement comprising a carriage, a motor thereon, a driving connection between the motor and carriage, a rock-shaft, digging-tools movable in the rock-shaft, upwardly-extended stems on said tools, levers mounted on the carriage for engaging with said stems, driving-plungers having pivotal connection with the levers, each driving-plunger consisting of telescopic sections, springs arranged between the sections, a shaft driven from the motor, and cranks or cams on said shaft arranged at different angles for engaging with the driving-plungers one after another, substantially as specified.

9. An agricultural implement comprising a carriage, a motor thereon, digging-tools carried by the carriage, a driving connection between the motor and carriage, means operated by the motor for forcing the digging-tools into the ground, then lifting the same, then drawing the tools forward with relation to the rock-shaft, and then moving the tools to vertical position, substantially as specified.

10. An agricultural implement comprising a carriage, a motor mounted thereon, a series of digging-tools carried by the carriage, a driving connection between the motor and carriage, a rock-shaft in which the digging-tools are movable, cams operated by the motor, and rod connections between said cams and the rock-shaft, substantially as specified.

11. An agricultural implement comprising a carriage, a motor mounted thereon, a rock-shaft supported in the carriage, digging-tools movable in the rock-shaft, a mutilated gear driven by the motor, and devices alternately operated by said mutilated gear for moving the carriage and actuating the digging-tools, substantially as specified.

12. An agricultural implement comprising a carriage, a motor for moving the same, a rock-shaft comprising two yielding sections, an operating connection between the motor and said rock-shaft, and digging-tools movable between said two sections, substantially as specified.

13. An agricultural implement comprising a carriage, a motor thereon, a rock-shaft supported on the carriage, a plurality of digging-tools movable in said rock-shaft, means operated by the motor for forcing said digging-tools into the ground one after another, means operated by the motor for moving said tools to lift the earth, means operated by the motor for lifting the tools to normal position, and means operated by the motor for moving the carriage forward after the operation of the digging-tools, substantially as specified.

14. An agricultural implement comprising a carriage, a motor mounted thereon, a driving connection between the motor and carriage, digging-tools supported on the carriage, means operated by the motor for actuating said digging-tools, and means for shifting the motor from driving connection with the digging-tools to driving connection with the carriage, substantially as specified.

In testimony whereof I have signed my name to this specification in the presence of two subscribing witnesses.

DAVID LUBIN.

Witnesses:
 JNO. M. RITTER,
 C. R. FERGUSON.